(12) United States Patent
Amano (10) Patent No.: US 12,393,292 B2
(45) Date of Patent: Aug. 19, 2025

(54) DISPLAY DEVICE

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/582,182

(22) Filed: Feb. 20, 2024

(65) Prior Publication Data

US 2024/0281077 A1   Aug. 22, 2024

(30) Foreign Application Priority Data

Feb. 21, 2023   (JP) .................................. 2023-024892

(51) Int. Cl.
*G06F 3/0362*   (2013.01)
*G02B 5/00*     (2006.01)

(52) U.S. Cl.
CPC ........... *G06F 3/0362* (2013.01); *G02B 5/003* (2013.01)

(58) Field of Classification Search
CPC .............................. G02B 5/003; G06F 3/0362
See application file for complete search history.

(56) References Cited

U.S. PATENT DOCUMENTS

| | | |
|---|---|---|
| 2012/0008070 A1 | 1/2012 | Takemoto |
| 2018/0074639 A1 | 3/2018 | Powell |
| 2020/0136618 A1* | 4/2020 | Lou ...................... G06F 3/04847 |
| 2021/0247552 A1* | 8/2021 | McCoy .................... G08B 7/06 |
| 2022/0253158 A1 | 8/2022 | Gaillard |
| 2023/0290293 A1* | 9/2023 | Sato ........................ G09F 13/20 |

FOREIGN PATENT DOCUMENTS

| | | |
|---|---|---|
| DE | 10 2010 010574 A1 | 9/2011 |
| JP | 2020-190832 A | 11/2020 |

OTHER PUBLICATIONS

B5 Extended European Search Report from EP 24157824, Jul. 2, 2024, 7pp.

* cited by examiner

*Primary Examiner* — Hang Lin
(74) *Attorney, Agent, or Firm* — Crowell & Moring LLP (57) ABSTRACT

A display input device includes a display panel, a knob member that protrudes forward from a display surface of the display panel and is formed of a transparent material, and a film-shaped louver film member that i) is provided between the display surface and the knob member, and ii) includes a plurality of first louvers extending in a first direction and a plurality of second louvers extending in a second direction intersecting the first direction and provided to intersect the plurality of first louvers, in which the louver film member suppresses light traveling toward an outer periphery of the knob member.

6 Claims, 7 Drawing Sheets

DISPLAY DEVICE

RELATED APPLICATION

The present application claims priority to Japanese Patent Application No. 2023-024892, filed Feb. 21, 2023, the entirety of which is herein incorporated by reference.

BACKGROUND

1. Field

The present disclosure relates to a display device, particularly suitable for use in a display device in which a protruding member formed of a transparent material is provided on a display surface of a display panel.

2. Description of the Related Art

Conventionally, a display device including a display panel having a function of displaying an image, such as a liquid crystal panel or an organic EL panel, has been widely used. In this type of display device, a touch panel is disposed so as to overlap a display panel, and a protruding member made of a transparent member is provided on a display surface of the display panel. Hereinafter, the display device including such a protruding member is referred to as a "display device with a protruding member" for convenience of description.

Figure 14:
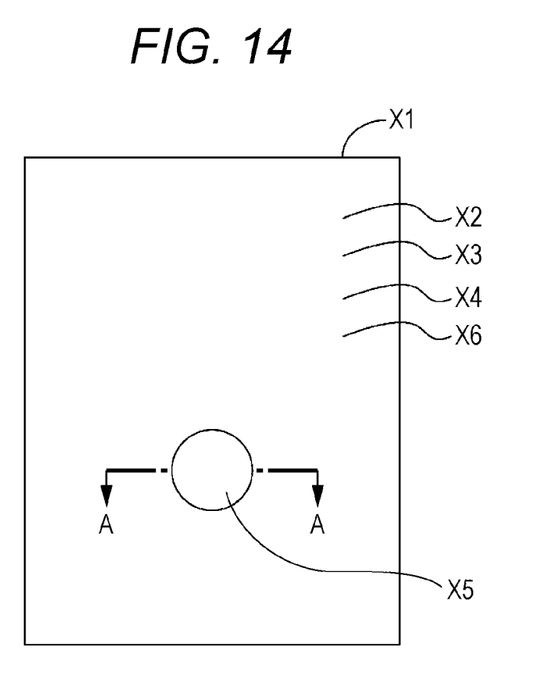
FIG. 14 is a front view of an input device with a knob of a conventional display device with a protruding member; and, FIG. 15 is a cross-sectional view taken along line A-A of FIG. 14.
Figure 15:
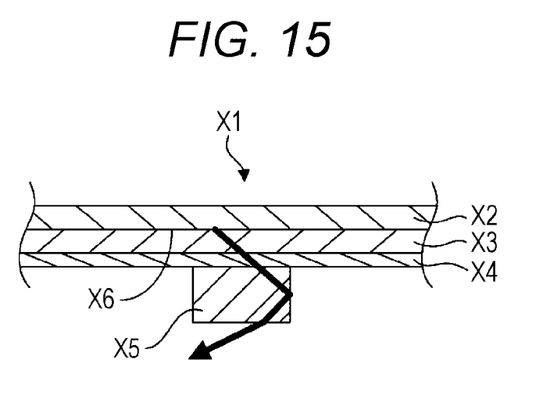

FIG. 14 is a front view of an example of a display device X1 with a protruding member, and FIG. 15 is a cross-sectional view taken along line A-A of FIG. 14. The display device X1 with a protruding member illustrated in FIGS. 14 and 15 is very simplified. As illustrated in FIGS. 14 and 15, the display device X1 with a protruding member includes a display panel X2, a sensor panel X3 disposed to overlap the display panel X2, a cover member X4 provided on a front surface of the sensor panel X3, and a protruding member X5 fixed to a cover member X4. The entire protruding member X5 is formed of a transparent material, so that a display surface X6 of the display panel X2 can be visually recognized through the protruding member X5. The protruding member X5 is a member assumed to be operated by a user touching the protruding member X5 with a finger. For example, when the finger rotates along the outer periphery of the protruding member X5 while the protruding member X5 is held by the finger, the rotation is detected based on the detection result of the sensor panel X3, the operation is enabled, and some action is executed.

Note that JP 2020-190832 A describes an input display device S1 (display device) including a display unit 11 (display panel) and a sensor panel (touch panel 2), in which a part of the touch panel 2 is curved to form a protrusion.

SUMMARY

However, the conventional display device with a protruding member described above has the following problems. That is, referring to FIG. 15, the display panel X2 emits light to make an image or video visually recognizable. In addition, the protruding member X5 is provided in front of the display surface X6 of the display panel X2. Therefore, as indicated by a thick arrow in FIG. 15, a part of the light emitted from display panel X2 enters the protruding member X5 formed of a transparent material, is reflected by the outer periphery of the protruding member X5, and is emitted to the outside of protruding member X5. At this time, there is a problem that reflection of light occurs on the outer periphery of the protruding member X5 due to the light reflected on the outer periphery of the protruding member X5. Such glare of light may cause deterioration in visibility of the display surface X6 and deterioration in quality (a sense of luxury) of the protruding member X5 as a transparent member.

The present disclosure has been made to solve such a problem, and an object of the present disclosure is to suppress reflection of light on an outer periphery of a protruding member in a display device in which the protruding member made of a transparent material is provided on a display surface of a display panel.

In order to solve the above problem, a display device of the present disclosure includes a display panel and a protruding member that protrudes forward with respect to a display surface of the display panel, and is formed of a transparent material. Further, the display device includes a film-shaped louver film member provided between the display surface and the protruding member, and having a plurality of first louvers extending in a first direction and a plurality of second louvers extending in a second direction intersecting the first direction, and provided to intersect the plurality of first louvers.

According to the present disclosure configured as described above, the diffusion of light emitted from the display surface of the display panel is suppressed by the louver film member, and the component of the light toward the outer periphery of the protruding member among the components of the light emitted from the display surface of the display panel is reduced. As a result, reflection of light on the outer periphery of the protruding member is suppressed.

DETAILED DESCRIPTION

Figure 1:
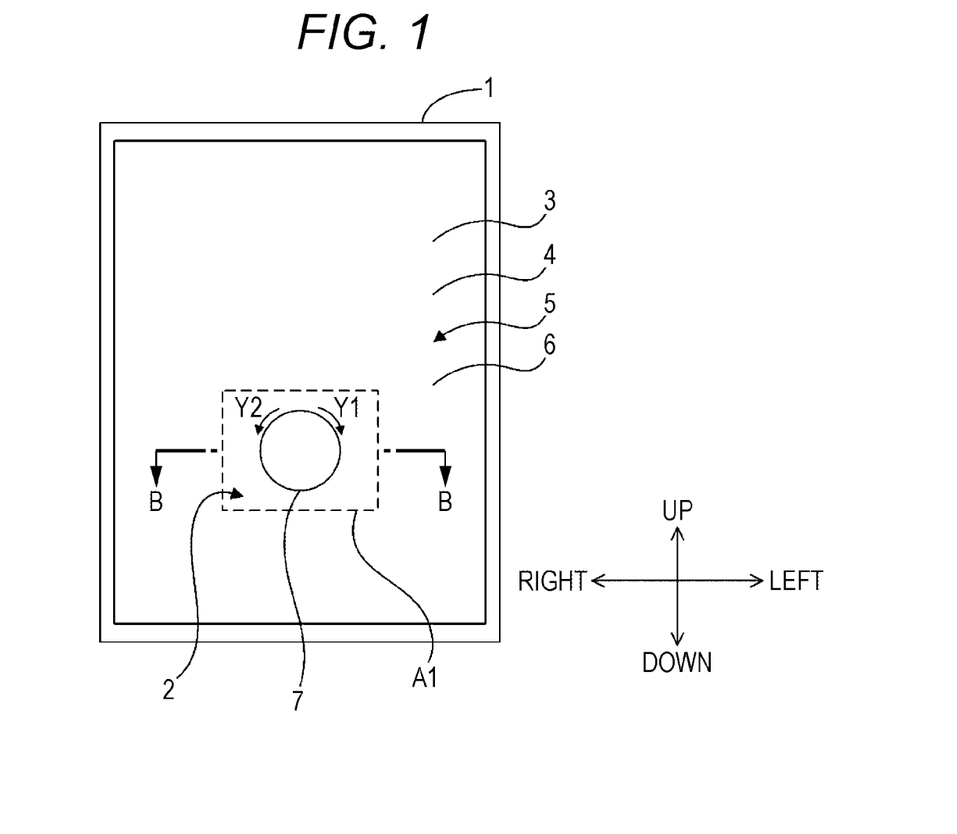
FIG. 1 is a front view of a display input device according to a first embodiment of the present disclosure.
Figure 2:
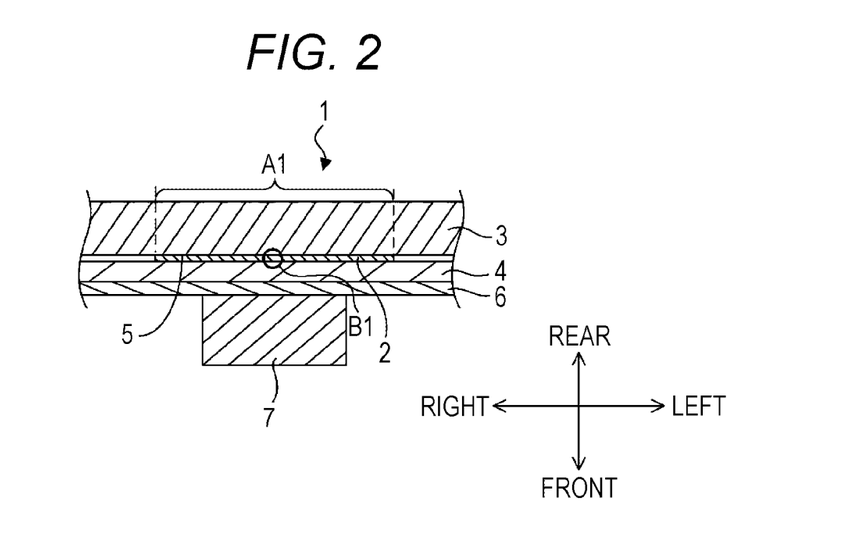
FIG. 2 is a cross-sectional view taken along line B-B of FIG. 1.

A first embodiment of the present disclosure will be described below based on the drawings. FIG. 1 is a front view of a display input device 1 (display device) according to the present embodiment. FIG. 2 is a cross-sectional view taken along line B-B of FIG. 1. The display input device 1 illustrated in FIGS. 1 and 2 shows a simplified structure of the device. Note that, for convenience of description, the dimensions of each member shown in the drawings are shown in proportions different from actual dimensions. In particular, a louver film member 2 to be described later is exaggeratedly drawn. Hereinafter, the front-rear direction, the left-right direction, and the up-down direction based on the display input device 1 are defined as indicated by arrows in FIGS. 1 and 2. Particularly, for right and left, a direction toward the right from a display surface 5 of the display panel 3 is defined as "right", and a direction toward the left from the display surface 5 is defined as "left".

The display input device 1 is provided in, for example, a central portion of a dashboard of a vehicle, a center console of the vehicle, or another predetermined place of the vehicle. However, the place where the display input device 1 is provided is not limited to the illustrated place. As illustrated in FIGS. 1 and 2, the display input device 1 includes a display panel 3 such as a liquid crystal display or an organic EL panel, and a sensor panel 4 disposed to overlap the display panel 3. A display surface 5 on which an image is displayed is formed on the display panel 3. The sensor panel 4 is a capacitive touch panel. The sensor panel 4 may be a self-capacitance type or a mutual capacitance type (of course, other methods may be used). Although not described in detail, the detection value of the sensor panel 4 is transmitted to a computer (not illustrated). The computer detects various operations by the user based on the detection result of the sensor panel 4.

As illustrated in FIGS. 1 and 2, a cover member 6 formed of glass or another transparent material is disposed on the front surface of the sensor panel 4. A knob member 7 (corresponding to a "protruding member" in the claims) is provided at a predetermined position on the cover member 6. The knob member 7 is fixed to the cover member 6 by adhesion or other units. In the present embodiment, the knob member 7 is separate from the cover member 6, but these members may be integrated. The knob member 7 is a columnar member protruding forward with respect to the display surface 5. However, the shape of the knob member 7 is not limited to the shape exemplified in the present embodiment. As an example, the shape of the knob member 7 may be a shape in which the diameter slightly increases (or decreases) toward the front.

The entire knob member 7 is formed of a transparent material. Therefore, the display surface 5 of the display panel 3 can be visually recognized through the knob member 7. A material constituting the knob member 7 may be a transparent material. The material is, for example, glass or resin.

Figure 3:
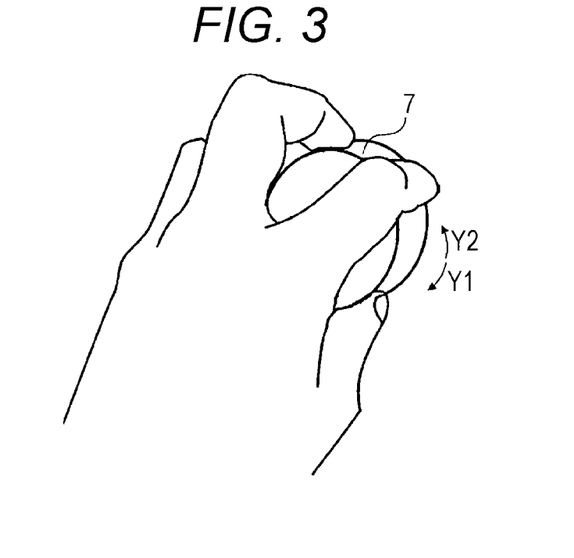
FIG. 3 is a view illustrating a usage mode of a knob member.

FIG. 3 is a view illustrating a usage mode of the knob member 7. As illustrated in FIG. 3, it is assumed that the knob member 7 is used while being held by a finger of a user's hand. As a simplified example, the knob member 7 can be used for adjusting the volume of an audio device (not illustrated). For example, after pinching the knob member 7 in the mode exemplified in FIG. 3, the user can gradually increase the volume of the audio device by rotating an entire hand in a clockwise direction Y1 (see also FIG. 1) while sliding the finger on the outer periphery of the knob member 7. In this case, each of the fingers in contact with the outer periphery of the knob member 7 follows along in the clockwise direction Y1 along the outer periphery. On the other hand, the user can gradually reduce the volume of the audio device by rotating an entire hand in a counterclockwise direction Y2 (see also FIG. 1) while sliding the finger on the outer periphery of the knob member 7 after pinching the knob member 7. In this case, each of the fingers in contact with the outer periphery of the knob member 7 follows along in the counterclockwise direction Y2 along the outer periphery.

As illustrated in FIGS. 1 and 2, the louver film member 2 is provided between the display panel 3 and the sensor panel 4 in a region A1. Although the louver film member 2 is exaggeratedly illustrated in FIG. 2, the louver film member 2 is actually a very thin member. As illustrated in FIG. 1, the region A1 is a region including the knob member 7 when the display input device 1 is viewed from the front. Hereinafter, the configuration and significance of the louver film member 2 will be described in detail.

Figure 4:
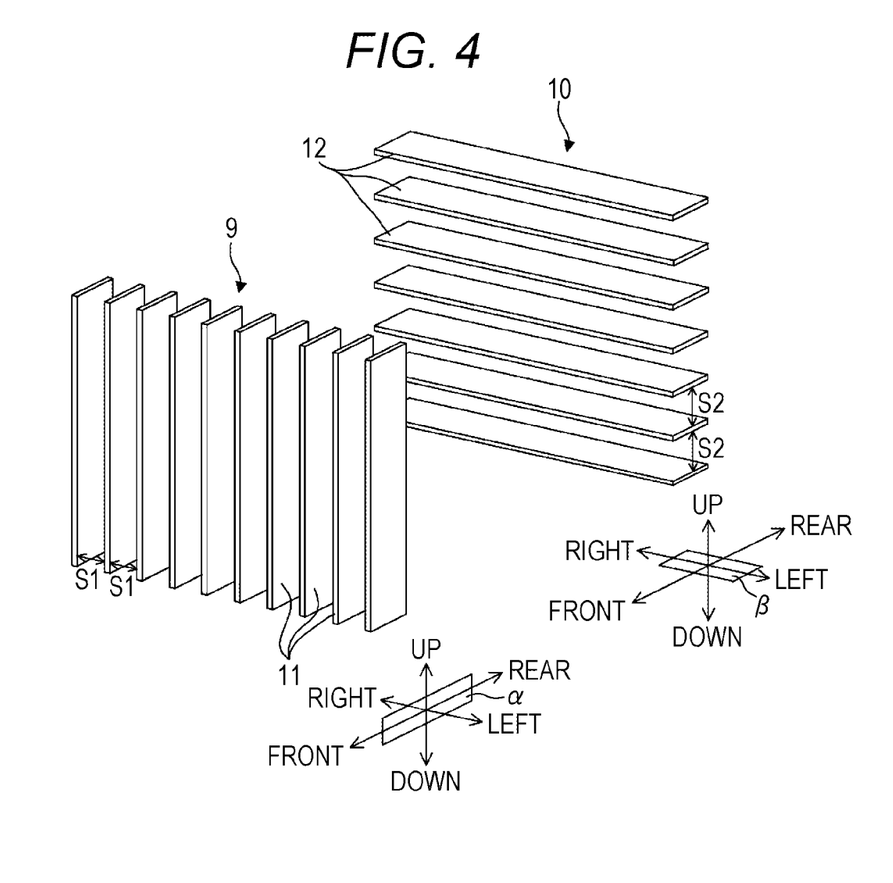
FIG. 4 is a perspective view of a louver film member.
Figure 5:
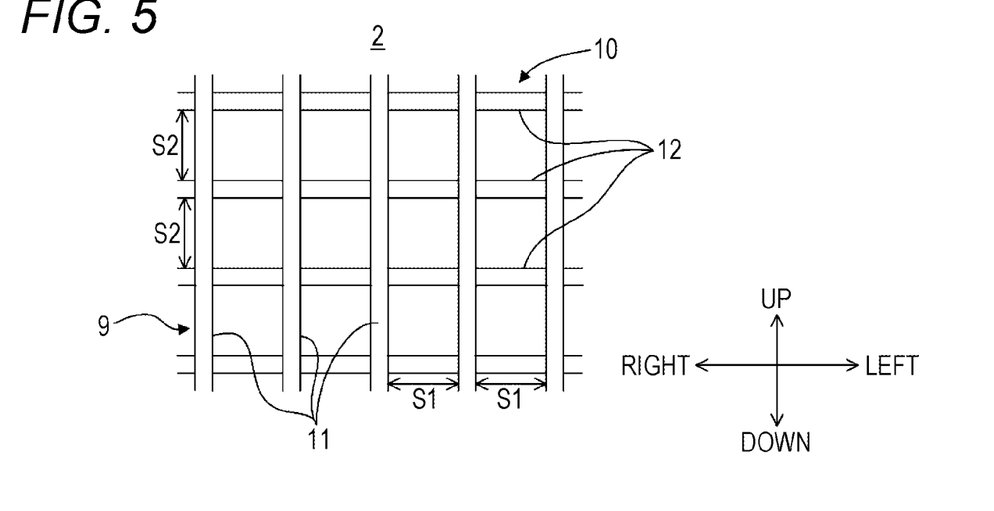
FIG. 5 is a front view of the louver film member.
Figure 6:
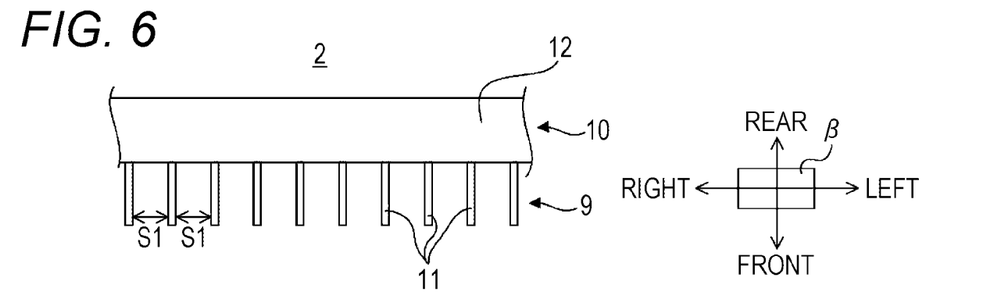
FIG. 6 is a plan view of the louver film member.
Figure 7:
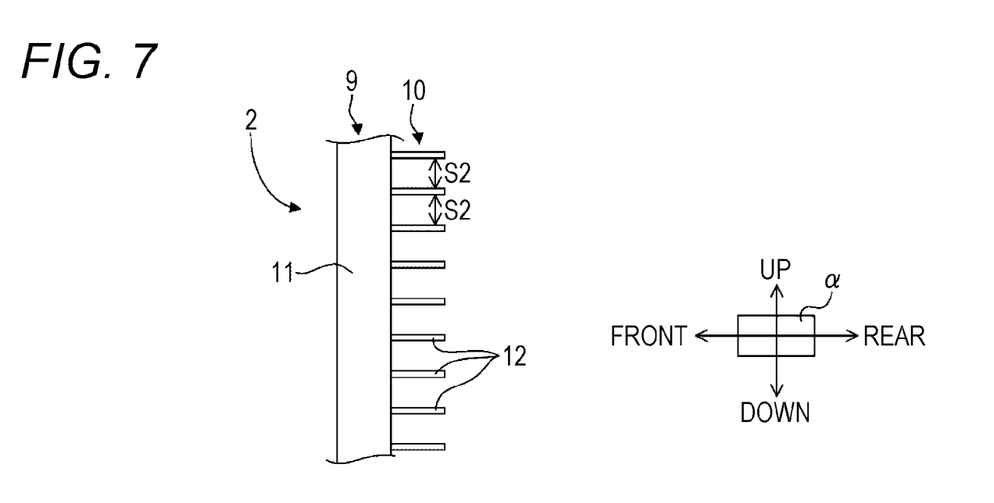
FIG. 7 is a right side view of the louver film member.

FIG. 4 is a perspective view illustrating a part of the louver film member 2 in a mode suitable for description. FIG. 5 is a view of a part of the louver film member 2 as viewed from the front. FIG. 6 is a view of a part of the louver film member 2 as viewed from above. FIG. 7 is a view of a part of the louver film member 2 as viewed from the right.

As illustrated in FIGS. 4 to 7, the louver film member 2 according to the present embodiment includes a first louver film 9 and a second louver film 10. More specifically, the louver film member 2 is configured by laminating the first louver film 9 and the second louver film 10. In FIGS. 4 to 7, for convenience of description of the first louver film 9 and the second louver film 10, actual dimensions are ignored, and a louver (louver board) is exaggeratedly drawn. However, the first louver film 9 and the second louver film 10 are film-shaped members, and are actually very thin members. That is, the louver film member 2 is a film-like member. In FIG. 4, for convenience of description, the first louver film 9 and the second louver film 10 are illustrated in a separated state. However, as illustrated in FIGS. 5 to 7, the first louver film 9 and the second louver film 10 are disposed to overlap each other in a close contact state.

As illustrated in FIGS. 4 to 7, the first louver film 9 includes a plurality of first louvers 11 extending in the vertical direction (first direction) and arranged side by side in the horizontal direction. The first louver 11 is installed such that a surface thereof is parallel to a virtual plane α including the vertical direction and the front-rear direction (virtual plane α orthogonal to the left-right direction). A first slit S1 is formed between the first louver 11 and the first louver 11 adjacent to each other in the first louver film 9. The first louver film 9 is installed such that the first slit S1 is formed in parallel with the front-rear direction. The front-rear direction coincides with the normal direction of the display surface 5 of the display panel 3. The "first slit S1 is parallel to the front-rear direction" means that when an imaginary line extending in the front-rear direction is extended in the first slit S1, the surface of the first louver 11 does not intersect the imaginary line.

As illustrated in FIGS. 4 to 7, the second louver film 10 is disposed behind the first louver film 9 to overlap the first louver film 9. However, as described above, in FIG. 4, the first louver film 9 and the second louver film 10 are illustrated in a separated state for convenience of description. The second louver film 10 includes a plurality of second louvers 12 extending in the left-right direction (second direction) and arranged side by side in the vertical direction. The second louver 12 is installed such that a surface thereof is parallel to a virtual plane β (virtual plane β orthogonal to the vertical direction) including the front-rear direction and the left-right direction. The second slit S2 is formed between the second louver 12 and the second louver 12 adjacent to each other in the second louver film 10. The second louver film 10 is installed such that the second slit S2 is formed in parallel with the front-rear direction. The "second slit S2 is parallel to the front-rear direction" means that when an imaginary line extending in the front-rear direction is extended in the second slit S2, the surface of the second louver 12 does not intersect the imaginary line.

Figure 8A:
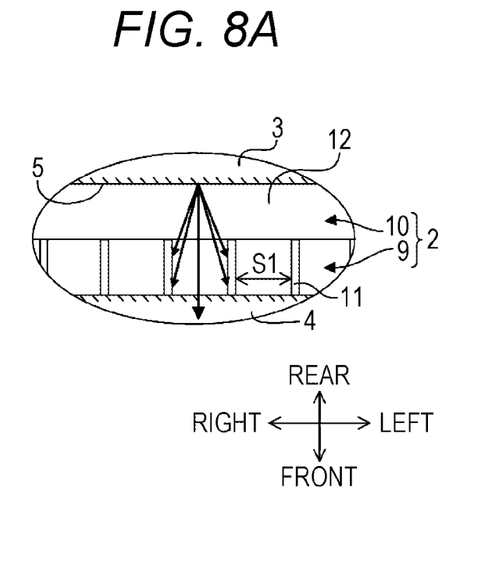
FIGS. 8A and 8B are views used for describing an effect by providing the louver film member.
Figure 8B:
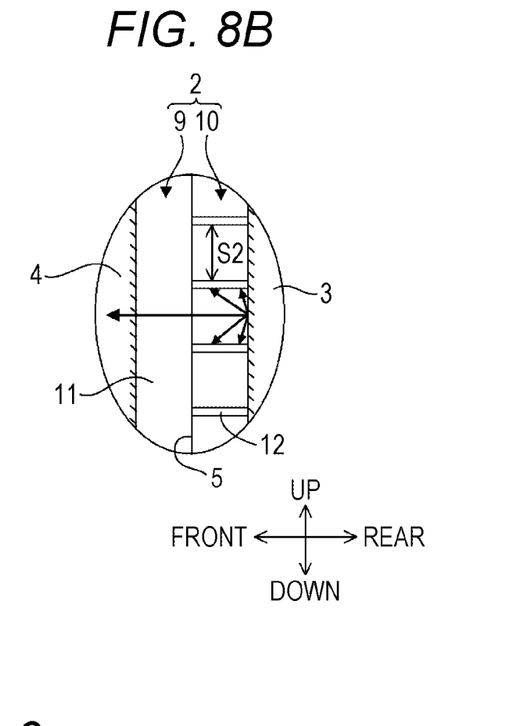

In the present embodiment, the louver film member 2 configured as described above is installed in the region A1 (FIG. 1) including at least the knob member 7 when viewed from the front on the display surface 5 of the display panel 3. That is, the louver film member 2 is provided between the display surface 5 and the knob member 7. As a result, the following effects are exhibited. FIGS. 8A and 8B are views used for describing an effect by providing the louver film member 2. FIG. 8A is an enlarged view of portion B1 of FIG. 2. FIG. 8B is a view schematically illustrating a state in which the portion B1 is viewed from the right in a mode suitable for description.

As described with reference to FIG. 15, in a case where the louver film member 2 is not present, part of the light emitted from the display panel 3 enters the knob member 7 formed of a transparent material, is reflected by the outer periphery of the knob member 7 (the boundary between the knob member 7 and the outside world), and is emitted to the outside of the knob member 7. At this time, there is a problem that reflection of light on the outer periphery of the knob member 7 occurs due to the light reflected on the outer periphery of the knob member 7. Such glare of light may cause deterioration in visibility of the display surface 5 and deterioration in quality (a sense of luxury) of the knob member 7 as a transparent member.

On the other hand, in the present embodiment, as illustrated in FIGS. 8A and 8B, the light emitted from the display surface 5 of the display panel 3 passes through the louver film member 2, and components other than the "components in the front-rear direction (normal direction of the display surface 5)" among the light components are reduced. That is, the diffusion of light emitted from the display surface 5 of the display panel 3 is suppressed by the louver film member 2. As a result, among the components of the light radiated from the display panel 3, the component of the light entering the knob member 7 and then traveling toward the outer periphery thereof is reduced. As a result, reflection of light on the outer periphery of the knob member 7 is suppressed, and deterioration in visibility of the display surface 5 and deterioration in quality (a sense of luxury) of the knob member 7 as a transparent member are suppressed.

In the first embodiment described above, the louver film member 2 is disposed in the region A. In this regard, the louver film member 2 may be disposed over the entire region of the display surface 5. That is, the louver film member 2 may be disposed in a region that covers the knob member 7 when viewed from the front, from the viewpoint of producing an effect of suppressing reflection of light on the outer periphery thereof.

Next, a second embodiment will be described. In the following description of the second embodiment, elements having the same structural features and performing the same functions as those of the first embodiment are denoted by the same reference numerals as those of the first embodiment, and a detailed description thereof will be omitted.

Figure 9:
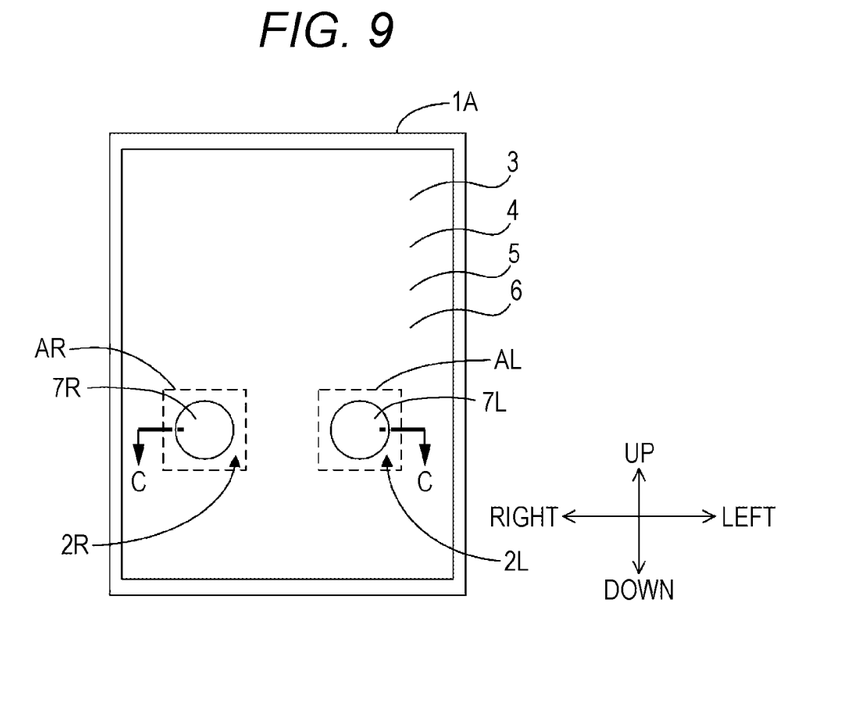
FIG. 9 is a front view of a display input device according to a second embodiment of the present disclosure.

FIG. 9 is a front view of a display input device 1A (display device) according to the present embodiment. As illustrated in FIG. 9, the display input device 1A includes a left knob member 7L (first protruding member) provided on the left side with respect to the center in the left-right direction, and a right knob member 7R (second protruding member) provided on the right side. Shapes and materials of the left knob member 7L and the right knob member 7R are the same as those of the knob member 7 according to the first embodiment, and these are made of a transparent material.

Figure 10:
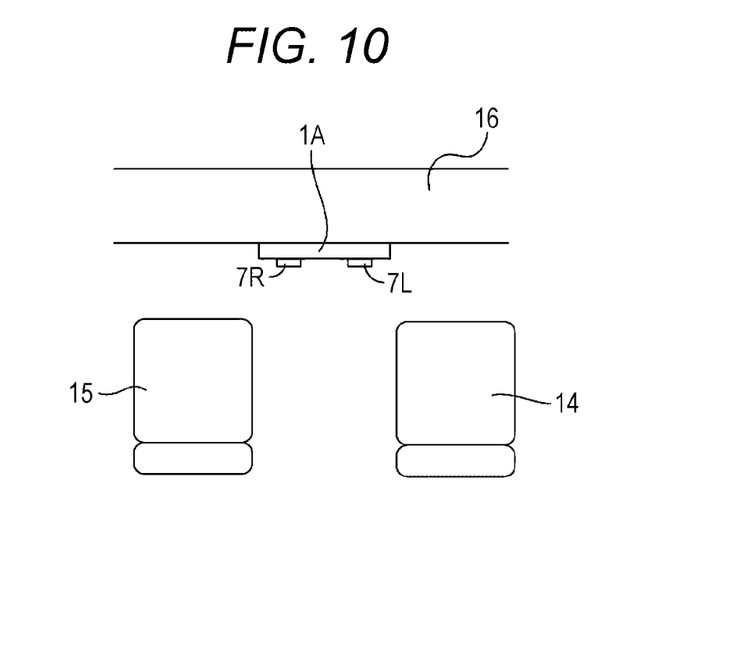
FIG. 10 is a view illustrating a state in which the display input device is installed.

FIG. 10 is a diagram schematically illustrating a simplified state in which the display input device 1A is provided. FIG. 10 illustrates an interior of a vehicle. In FIG. 10, reference numeral 14 denotes a driver's seat, reference numeral 15 denotes a passenger's seat, and reference numeral 16 denotes a dashboard. As illustrated in FIG. 10, the display input device 1A according to the present embodiment is provided in a middle portion between a driver's seat 14 and a passenger's seat 15 in a dashboard 16. The left knob member 7L is assumed to be used by a passenger sitting on the driver's seat 14. That is, the left knob member 7L is used by the user located on the left when facing the front side of the display panel 3. In addition, the right knob member 7R is assumed to be used by a passenger seated on the passenger's seat 15. That is, the right knob member 7R is used by the user positioned on the right when facing the front side of the display panel 3.

In the present embodiment, the left louver film member 2L (first louver film member) is provided corresponding to the left knob member 7L, and the right louver film member 2R (second louver film member) is provided corresponding to the right knob member 7R. More specifically, as illustrated in FIG. 9, the left louver film member 2L is provided in a left corresponding region AL including the left knob member 7L when the display surface 5 of the display panel 3 is viewed from the front. Similarly, when the display surface 5 is viewed from the front, the right louver film member 2R is provided in a right corresponding region AR including the right knob member 7R. The left corresponding region AL and the right corresponding region AR are regions that do not overlap each other.

Figure 11:
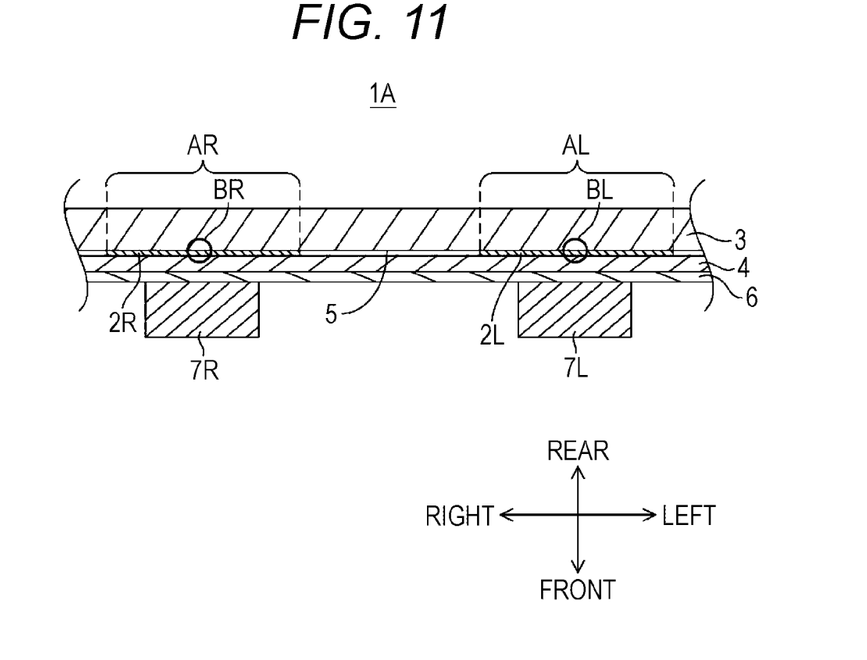
FIG. 11 is a cross-sectional view taken along line C-C of FIG. 9.

FIG. 11 is a cross-sectional view taken along line C-C of FIG. 9. As illustrated in FIG. 9, the display input device 1A includes the display panel 3. The sensor panel 4 disposed to overlap with the display panel 3 is provided in front of the display surface 5, and the cover member 6 is provided in front of the sensor panel 4. The cover member 6 is provided with the left knob member 7L and the right knob member 7R. The left louver film member 2L is provided in the left corresponding region AL between the display surface 5 of the display panel 3 and the sensor panel 4. That is, the left louver film member 2L is provided between the display surface 5 and the left knob member 7L. The right louver film member 2R is provided in the right corresponding region AR between the display surface 5 of the display panel 3 and the sensor panel 4. That is, the right louver film member 2R is provided between the display surface 5 and the right knob member 7R.

Figure 12:
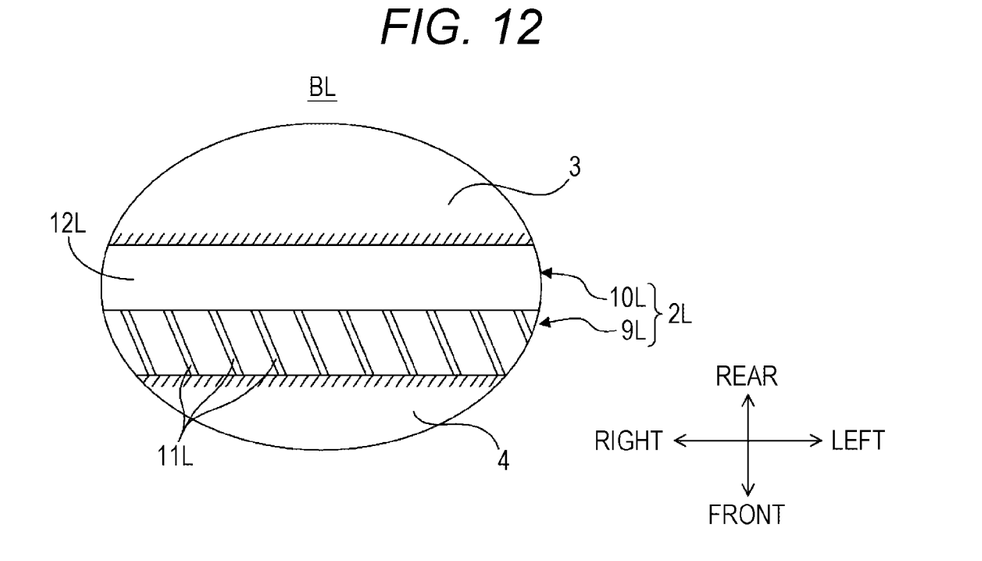
FIG. 12 is an enlarged view of a part of FIG. 11.

FIG. 12 is an enlarged view of a portion BL in FIG. 11. However, in FIG. 12, the louvers (louver boards) are exaggerated. The left louver film member 2L includes a left first louver film 9L and a left second louver film 10L. The structure of the left second louver film 10L is the same as the structure of the second louver film 10 according to the first embodiment. The left second louver film 10L includes a plurality of left second louvers 12L (second louvers) extending in the left-right direction. On the other hand, as illustrated in FIG. 12, the left first louver film 9L includes a plurality of left first louvers 11L (first louvers). Each of the plurality of left first louvers 11L extends in the vertical direction (first direction) in a state of being inclined to be displaced leftward toward the front. That is, the left first louver 11L of the left first louver film 9L extends in the vertical direction in a state of being inclined toward the position of the user (passenger seated on the driver's seat) who uses the left knob member 7L.

The above configuration related to the left louver film member 2L achieves the following effects. That is, the point that the diffusion of the light emitted from the display surface 5 is suppressed by the left louver film member 2L and the reflection of the light on the outer periphery of the left knob member 7L is suppressed is the same as in the first embodiment. Furthermore, in the present embodiment, the left first louver 11L is inclined toward the position of the user (passenger seated on the driver's seat) who uses the left knob member 7L. Therefore, when the passenger sitting on the driver's seat 14 visually recognizes the left corresponding region AL corresponding to the left knob member 7L that the passenger may use, deterioration of visibility due to the provision of the left louver film member 2L is suppressed.

Figure 13:
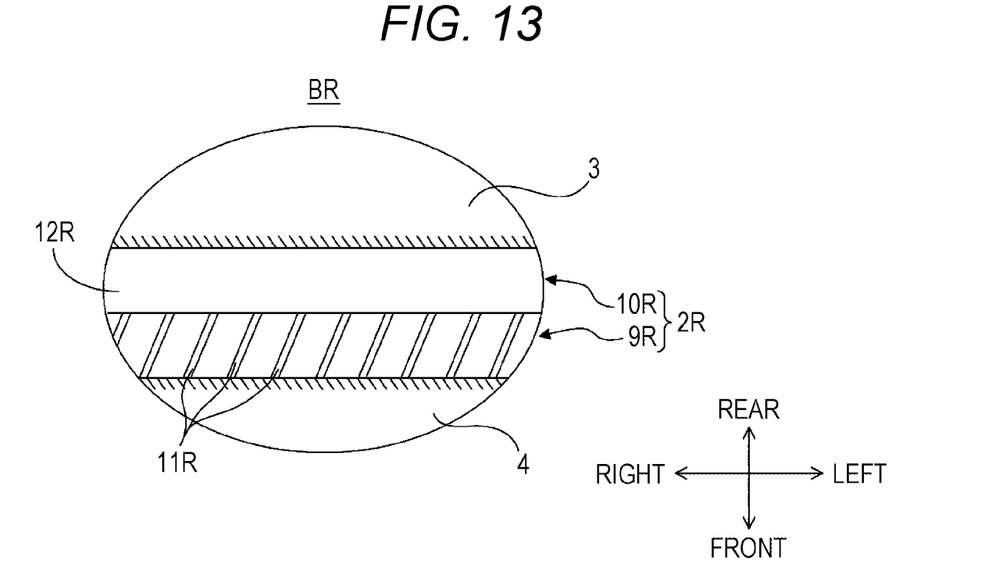
FIG. 13 is an enlarged view of a part of FIG. 11.

FIG. 13 is an enlarged view of a region BR in FIG. 11. However, in FIG. 13, the louvers (louver boards) are exaggerated. The right louver film member 2R includes a right first louver film 9R and a right second louver film 10R. The structure of the right second louver film 10R is the same as the structure of the second louver film 10 according to the first embodiment. The right second louver film 10R includes a plurality of right second louvers 12R (second louvers) extending in the left-right direction. On the other hand, as illustrated in FIG. 13, the right first louver film 9R includes a plurality of right first louvers 11R (first louvers). Each of the plurality of right first louvers 11R extends in the vertical direction (first direction) in a state of being inclined to be displaced to the right as going forward. That is, the right first louver 11R of the right first louver film 9R extends in the vertical direction in a state of being inclined toward the position of the user (passenger seated on the passenger's seat) who uses the right knob member 7R. The effect exhibited by the right louver film member 2R is similar to the effect exhibited by the left louver film member 2L. That is, deterioration in visibility when the passenger sitting on the passenger's seat 15 visually recognizes the right corresponding region AR corresponding to the right knob member 7R is suppressed.

Although the second embodiment has been described above, the second embodiment may have the following configuration. That is, in the second embodiment, the display input device 1A includes the two protruding members of the left knob member 7L and the right knob member 7R. On the other hand, the number of the protruding members is not limited to two. That is, it is sufficient that the protruding member is used by the user located on the right or left toward the front of the display panel 3, and the first louver 11 extends in the vertical direction in a state of being inclined toward the position of the user. For example, in the second embodiment, the right knob member 7R and the right louver film member 2R corresponding thereto may not be provided in the display input device 1A.

Hereinabove, although sone embodiments of the present disclosre have been described, the respective embodiments are only examples of embodiments for carrying out the present disclosure, and thus the technical scope of the present disclosure should not be interpreted to be limited to the disclosed embodiments. In other words, the present disclosure can be performed in various forms without departing from the main points or the main characteristics of the present disclosure.

For example, the display device to which the present disclosure is applied is not limited to a device including a sensor panel. That is, the present disclosure is widely applicable to a device which includes a display panel and in which a protruding member made of a transparent material is provided on a display surface of the display panel.

In the first embodiment, the knob member 7 assumed to be used in a held state corresponds to the protruding member. Similarly, in the second embodiment, the left knob member 7L and the right knob member 7R assumed to be used in a held state correspond to the protruding members. However, the protruding member is not limited to a member assumed to be used as described herein. The protruding member may be any member that protrudes forward from the display surface of the display panel and is made of a transparent material.

In the first embodiment, the louver film member 2 is configured by laminating the first louver film 9 and the second louver film 10. In this regard, the louver film member may be composed of one louver film. In this case, the louver film member formed of one louver film includes a plurality of first louvers extending in a first direction and a plurality of second louvers extending in a second direction intersecting the first direction and provided to intersect the plurality of first louvers. The same applies to the second embodiment.

In addition, in the first embodiment, the second louver film 10 is provided behind the first louver film 9. In this regard, the first louver film 9 may be provided behind the second louver film 10. The same applies to the second embodiment.

What is claimed is:

1. A display device comprising:
   a display panel;
   a protruding member that protrudes forward with respect to a display surface of the display panel and is formed of a transparent material; and,
   a film-shaped louver film member including a plurality of first louvers provided between the display surface and the protruding member and extending in a first direction, and a plurality of second louvers extending in a second direction intersecting the first direction and provided to intersect the plurality of first louvers;
   wherein the display panel is provided with a first protruding member and a second protruding member,
   wherein the first protruding member configured for use by a user positioned on a left side facing toward a side in front of the display panel, and a first louver film member is provided between the first protruding member and the display surface,
   wherein the second protruding member is configured for use by a user positioned on a right side of the display panel facing toward a side in front of the display panel, and a second louver film member is provided between the second protruding member and the display surface,
   wherein the first louver of the first louver film member extends in the vertical direction in a state of being inclined toward a position of a user who uses the first protruding member, and
   wherein the first louver of the second louver film member extends in the vertical direction in a state of being inclined toward a position of a user who uses the second protruding member.

2. The display device according to claim 1, wherein the louver film member comprises a laminated first louver film having the first louver and a second louver film having the second louver.

3. The display device according to claim 1, wherein the louver film member comprising a laminated first louver film having the first louver and a second louver film having the second louver.

4. The display device of claim 1, wherein the first protruding member and the second protruding member are fixed relative to the display panel.

5. A display device comprising:
- a display panel;
- a first protruding member that protrudes forward with respect to a display surface of the display panel and is formed of a transparent material, wherein the first protruding member is configured for use by a first user positioned on a left side facing toward a side in front of the display panel, and a first louver film member is provided between the first protruding member and the display surface;
- a second protruding member that protrudes forward with respect to the display surface of the display panel and is formed of a transparent material, wherein the second protruding member is configured for use by a second user positioned on a right side of the display panel facing toward a side in front of the display panel, and a second louver film member is provided between the second protruding member and the display surface;
- wherein the first louver of the first louver film member extends in the vertical direction in a state of being inclined toward a position of a user who uses the first protruding member; and,
- wherein the first louver of the second louver film member extends in the vertical direction in a state of being inclined toward a position of a user who uses the second protruding member.

6. The display device of claim 5, wherein the first protruding member and the second protruding member are fixed relative to the display panel.

\* \* \* \* \*